March 31, 1970    D. R. MacMILLAN ET AL    3,503,426
ONE-PIECE ELBOW JACKET AND METHOD OF MAKING THE SAME
Filed Oct. 11, 1967
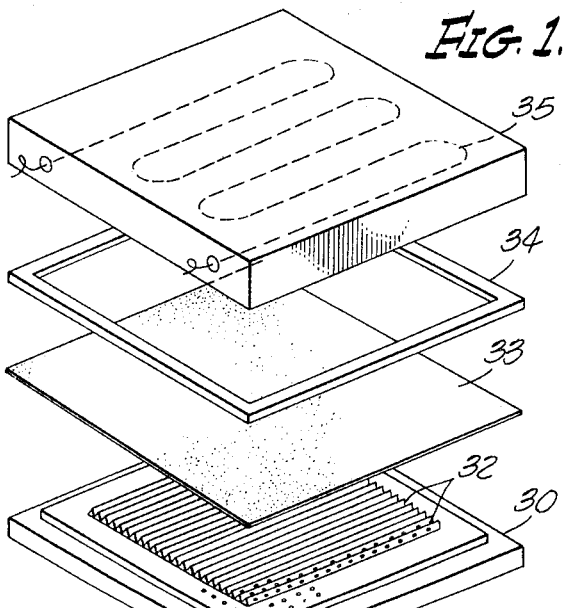
FIG. 1.
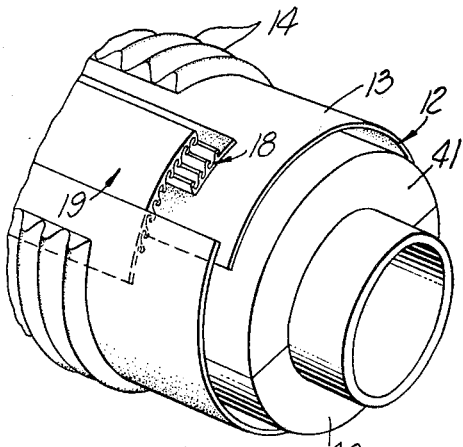
FIG. 3.
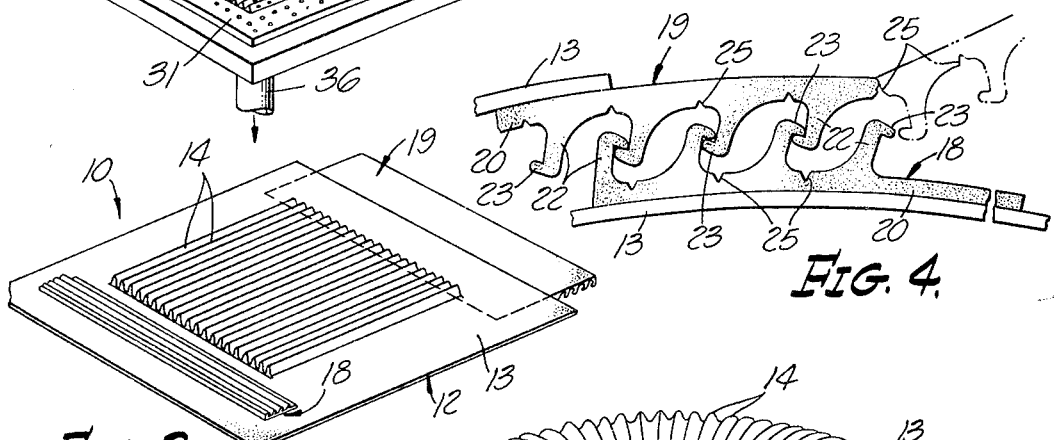
FIG. 2.    FIG. 4.
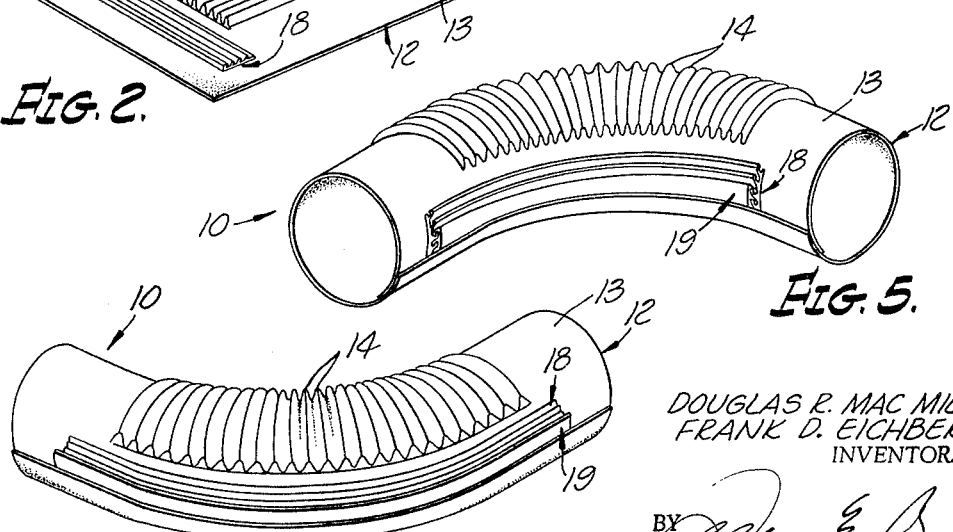
FIG. 5.
FIG. 6.
DOUGLAS R. MAC MILLAN
FRANK D. EICHBERG
INVENTORS.
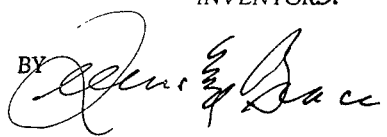
ATTORNEYS United States Patent Office 3,503,426
Patented Mar. 31, 1970

3,503,426
ONE-PIECE ELBOW JACKET AND METHOD OF MAKING THE SAME
Douglas R. MacMillan, Buena Park, Calif. and Frank D. Eichberg, Scottsdale, Ariz., assignors to Walter A. Plummer, Sherman Oaks, Calif.
Filed Oct. 11, 1967, Ser. No. 674,509
Int. Cl. F16l 59/12, 11/12, 43/00
U.S. Cl. 138—168
5 Claims

ABSTRACT OF THE DISCLOSURE

A one-piece seamed tubular plastic jacket for enclosing elbows and the like bends in conduits, cabling, wire harnesses, etc. and a method of making the same using vacuum-forming techniques. The main body is corrugated circumferentially to facilitate flexing and the expansion and contraction of the jacket when applied to an object to be enclosed. The seam includes provision for locking it assembled in various degrees of overlap to accommodate objects of differing sizes. A series of weakness grooves lengthwise of the seam expedites removal of excess seam material.

---

This invention relates to an improved unitary jacket for enclosing elbow junctions of conduits, cabling and the like with a snug fitting, neat appearing, one-piece jacket and to a method of fabricating the same. The main body is formed from sheet thermoplastic material by vacuum forming accordion-like pleats crosswise of the central portion of the sheet and securing fastener means along the opposite lateral edges of the resulting sheet. Desirably, the fastener means comprises seam forming tapes of plastic material which are selectively interlocked in one of various overlapping positions as necessary to hold the jacket snugly wrapped about a particular elbow junction. Preferably the fastener means comprises a pair of multiple grooved seam-forming tapes capable of mating in several different degrees of overlap and having one or more weak grooves permitting an excess edge portion of a tape to be readily detached. The jacket has many applications and is particularly suitable for use in holding preformed sections of heat insulation in position about elbow junctions of both hot and cold pipes.

The problem of providing a wide variety of cabling and conduit systems with a suitable appearance and protective covering continues to present problems. Coverings fabricated from sheet plastic material and equipped with closure means for holding them in assembled position have certain advantages but are subject to the serious disadvantage that this material is not readily, neatly and inexpensively fabricated for assembly about elbows and other junctions. These problems are overcome in the present invention by the simple technique of forming the major portion of the central area of a rectangular sheet of thermoplastic material with accordion-like pleats thereby enabling this portion of the jacket to expand and contract in different areas as necessary to conform to the structure being enclosed while at the same time providing an attractive and pleasing appearance. The edges of the jacket opposite the ends of the pleats are provided with a readily closed adjustable seam effective to hold the jacket snugly in place despite considerably tolerance variations in the size of the structure being jacketed. The jacket is particularly suitable for assembly about pre-formed heat insulation and serves not only as a pleasing appearance covering but additionally as means to hold the insulation components firmly and tightly assembled about ducting.

A preferred form of seam forming tape is one having a multiplicity of interlockable tongues and grooves. The overlapped tapes are pulled snugly about the ducting and then pressed into mating relationship in this circumferentially tensioned condition and then utilizes this tension as an aid in holding the seams assembled.

Accordingly, it is a primary object of the present invention to provide an improved versatile unitary jacket for enclosing an elbow junction and to a novel method of fabricating the jacket.

Another object of the invention is the provision of a simple, inexpensive fabricating technique for vacuum forming sheet thermoplastic material to accordion-pleat the central portion thereof equipped along its opposite lateral edges with interlockable seam-forming means for holding the jacket assembled about an object such as an elbow junction.

These and other specific objects will appear upon reading the following specification and claims and upon considering in connection therewith the attached drawing to which they relate.

Referring now to the drawing in which a preferred embodiment of the invention is illustrated.

FIGURE 1 is an exploded view in perspective of parts of vacuum forming equipment useful in practicing the invention method;

FIGURE 2 is a perspective view of the invention elbow jacket prior to assembly about an elbow junction;

FIGURE 3 is a fragmentary perspective view showing one end of the jacket assembled to hold insulation in place about a conduit;

FIGURE 4 is an end elevational view on enlarged scale showing details of the interlocking seam; and FIGURES 5 and 6 are perspective views showing the invention jacket assembled in two different modes.

Referring more particularly to FIGURES 2, 5 and 6, there is shown an exemplary embodiment of the elbow jacket designated generally 10. FIGURE 2 shows the jacket disassembled and lying flat whereas FIGURE 5 shows the configuration of the jacket when assembled about an elbow junction with the seam located along the shorter radius. FIGURE 6 is a view similar to FIGURE 5 but showing the seam extending along the longer radius.

Main body 12 comprises a generally rectangular sheet of supple thermoplastic material having a wide flat border 13 surrounding the central area, the latter being molded to form a multiplicity of accordion-like pleats 14 lying parallel to one another and extending crosswise of the sheet in the manner best shown in FIGURE 2. It will be understood that these pleats are an integral part of sheet 12 and of the surrounding border 13.

The flat border portions opposite the ends of pleats 14 are preferably provided with suitable fastener means for holding the jacket assembled. A particularly suitable type of fastener comprises a pair of interlockable seam forming tapes 18, 19. These tapes are identical in design but one may be and preferably is wider than the other. These tapes are molded or extruded from a suitable thermoplastic material and include a thin wide main body strip 20 having a flat surface adapted to be bonded or heat fused to the underlying surface of the jacket body. Projecting outwardly from the opposite face of this main body strip 20 are a plurality of long parallel narrow L-shaped ribs 22 each provided with a short leg or hook 23 along its outer free end. Ribs 22 are inclined acutely to a plane normal to the main body strip 20 and the junctions of the ribs with the body strip are thicker and shaped generally as indicated in FIGURE 4 to strengthen the ribs and to serve other functions as will be explained presently. Hooks 23 are likewise inclined downwardly toward the thickened base of the adjacent rib and are spaced from the adjacent rib sufficiently to permit engagement and disengagement of the two tapes relative to one another.

From the foregoing description of the interlocking tapes 18, 19 it will be apparent that the closely spaced rows of hooked ribs 22, 23 cooperate with one another in providing a plurality of interlocking tongues and grooves. A seam comprising a pair of tapes 18, 19 can be interlocked with one another by overlapping their free edges and pressing the hooked ribs of one tape into the hooked ribs of the other tape. Tension applied to the remote lateral edges of the two tapes then acts to engage the adjacent pairs of hooks of the two tapes and to lock them assembled in the manner made clear in FIGURE 4. So long as the tapes remain under tension crosswise of their lengths they are held firmly engaged and may be disengaged only by relaxing this tension as by grasping the free edge of one and pulling it in a direction to disengage the hooks.

Desirably the bottom of the grooves between ribs 22 are provided with V-shaped grooves 25 extending partially through the main body strip 20. These grooves weaken the main body 20 and facilitate severing a selected excess portion of the outer tape 19. Thus the portion of tape 19 shown in dot-and-dash lines along the right hand side of FIGURE 4 is shown in the process of being detached by subjecting one of the grooves 25 to excessive shear stress.

An important feature of the interlocking tapes is the fact that the two tapes may be assembled in any of a number of overlapped positions. Referring to FIGURE 3 it will be seen that tape 19 is wider than tape 18 and has a larger number of tongued ribs 22. This permits tape 19 to be pulled crosswise of the tongued flanges of tape 18 until the jacket is drawn tautly about the underlying structure whereupon tape 19 is pressed downwardly until the ribs interlock whereupon the applied tension is relaxed. If the underlying structure is of smaller diameter than shown in FIGURE 3, the two tapes are simply drawn into a greater degree of overlap before being pressed into mating relationship.

Referring now to FIGURE 2 there is shown a preferred mode of fabricating the invention elbow jacket employing vacuum forming technique. The essential equipment for this purpose is well known to those skilled in vacuum forming and for this reason only the more essential features of the equipment components are represented generally schematically. Thus the equipment comprises a main frame 30 supporting a perforated plate 31 on which is mounted a suitable perforated form 32 shaped to form pleats 14 of the jacket. A sheet of thermoplastic such as polyvinyl chloride having dimensions somewhat greater than perforated plate 31 is then supported above pattern 32 and its edges are clamped to the main body 30 of the equipment in an airtight manner, as by a clamping frame 34. After this sheet has been heated until the material can be drawn, the chamber below perforated plate 31 and perforated form 32 is subjected to a vacuum as by a conduit 36 leading to a vacuum chamber or the like. The pressure differential so formed across the heated sheet 33 stretches the heated plastic sheet into conformity with pattern 14. This pressure differential is maintained while the sheet cools and takes a set. The permanently formed sheet is then removed from the vacuum forming equipment and tapes 18 and 19 are heat fused, bonded or otherwise firmly secured to flat margin portions 13 extending along the opposite ends of pleats 14 and any flashing is trimmed from the marginal edges of the main body. Desirably, the interlocking tapes have a length somewhat less than the lateral edge portions of the main body so as to terminate short of the tubular ends of the completed jacket.

A typical application of the invention jacket is shown in FIGURE 3 wherein the jacket is employed to hold preformed sections 40, 41 of heat insulating material assembled about an elbow of a hot or cold water conduit system. Insulation sections 40, 41 may be temporarily held assembled by the application of encircling sections of adhesive tape. Jacket 10 is then wrapped about the insulated elbow with the seam along either the inner or the outer radius of the elbow. In smaller radius elbows, it is usually more convenient and expedient to locate the seam along the outer or longer radius side of the elbow in the manner indicated in FIGURE 6. The assembly operation is performed quickly and simply by drawing the jacket taut, one hand being used to hold the edge carrying tape 18 snugly pressed against the underlying structure while the free edge of tape 19 is pulled into overlapping relation under firm tension before pressing the hooked ribs into mating relationship. This operation is usually performed progressively from one end of the seam toward the other end.

While the particular one-piece elbow jacket and method of making the same herein shown and disclosed in detail is fully capable of attaining the objects and providing the advantages hereinbefore stated, it is to be understood that it is merely illustrative of the presently preferred embodiments of the invention and that no limitations are intended to the details of construction or design herein shown other than as defined in the appended claims.

We claim:

1. A unitary elbow jacket adapted to be readily assembled about and disassembled from an elbow junction, said elbow jacket comprising a sheet of supple thermoplastic material having first and second pairs of flat edge portions, a multiplicity of pleats extending crosswise of said sheet of material between said first pair of said flat edge portions, and fastener means secured to said first pair of flat edge portions and cooperating when engaged to hold said jacket assembled about an elbow junction selectively engageable in several different degrees of overlap circumferentially of said jacket to hold said jacket snugly assembled about an elbow junction and with portions of said corrugations expanded and other portions thereof contracted as necessary to accommodate the jacket to the contour of an elbow junction, said fastener means comprising a pair of opposing tapes of flexible material each having a plurality of hooked ribs of L-shape in cross-section extending lengthwise of the first pair of the edge portions of said sheet material as said jacket is wrapped about an elbow junction, and said hooked ribs being shaped to interlock as the overlapped ribbed portions of said tapes are pressed into mating relationship.

2. An elbow jacket as defined in claim 1 characterized in that each of said tapes includes a wide strip having a plurality of long narrow hooked ribs projecting outwardly therefrom, and said tapes being mateable selectively in different degrees of overlap as the hooked ribs of one tape are pressed between the hooked ribs of the other of said tapes.

3. An elbow jacket as defined in claim 1 characterized in that said wide strip of tape is formed with V-shaped weakened failure grooves between adjacent ones of said hooked ribs to facilitate separation of one or more of said hooked ribs from a selected one of said tapes.

4. An elbow jacket as defined in claim 1 characterized in that the opposite ends of said pair of tapes terminate inwardly from the respective ends of said first flat edge portions of said sheet.

5. An elbow jacket as defined in claim 1 characterized in that said accordion like pleats are integral with said sheet of thermoplastic material with their opposite ends terminating close to an associate one of said fastener means.

References Cited

UNITED STATES PATENTS

| | | | |
|---|---|---|---|
| 2,068,180 | 1/1937 | Horsman | 138—128 |
| 2,524,662 | 10/1950 | Harding | 138—121 |
| 2,960,561 | 11/1960 | Plummer | 138—128 X |
| 3,042,736 | 7/1962 | Salisbury | 138—121 X |
| 3,076,669 | 2/1963 | Schlein | 285—179 |
| 3,161,210 | 12/1964 | Loof | 138—121 X |
| 3,336,950 | 8/1967 | Fochler | 138—166 X |
| 3,106,941 | 10/1963 | Plummer | 138—128 |

HERBERT F. ROSS, Primary Examiner

U.S. Cl. X.R.

138—128; 156—203; 285—179.